United States Patent [19]

Bakker

[11] Patent Number: 5,062,034
[45] Date of Patent: Oct. 29, 1991

[54] DEVICE FOR EMULATING A MICROCONTROLLER USING A PARENT BOND-OUT MICROCONTROLLER AND A DERIVATIVE NON-BOND-OUT MICROCONTROLLER

[75] Inventor: Jacobus M. Bakker, Eindhoven, Netherlands

[73] Assignee: U.S. Philips Corporation, New York, N.Y.

[21] Appl. No.: 440,455

[22] Filed: Nov. 20, 1989

Related U.S. Application Data

[63] Continuation of Ser. No. 116,603, Nov. 2, 1987, abandoned, which is a continuation of Ser. No. 75,712, Jul. 17, 1987, abandoned.

[30] Foreign Application Priority Data

Nov. 11, 1986 [NL] Netherlands ............... 8602849

[51] Int. Cl.⁵ ............................................. G06F 11/30
[52] U.S. Cl. ................................. 364/200; 364/264; 364/267; 364/267.4; 364/267.6
[58] Field of Search ... 364/200 MS File, 900 MS File; 371/16.2, 22.5

[56] References Cited

U.S. PATENT DOCUMENTS

| 108,832 | 10/1988 | Hill et al. | |
|---|---|---|---|
| 4,370,709 | 1/1983 | Fosdick | 364/200 |
| 4,514,805 | 4/1985 | McDonough et al. | 364/200 |
| 4,527,234 | 7/1985 | Bellay | 364/200 |
| 4,591,975 | 5/1986 | Wade et al. | 364/200 |
| 4,607,366 | 8/1986 | Stadlmeier et al. | 364/200 |
| 4,633,417 | 12/1986 | Wilburn et al. | 364/550 |
| 4,674,089 | 6/1987 | Poret et al. | 364/200 |
| 4,689,740 | 8/1989 | Moelands et al. | 364/200 |
| 4,720,778 | 9/1987 | Hall | |
| 4,739,475 | 4/1988 | Mensch, Jr. | 364/200 |
| 4,764,926 | 8/1988 | Knight et al. | 371/22.5 |
| 4,785,416 | 11/1988 | Stringer | 364/200 |
| 4,809,167 | 2/1989 | Pawloski et al. | 364/200 |
| 4,811,345 | 3/1989 | Johnson | 364/200 |
| 4,847,805 | 7/1989 | Ishii et al. | 371/16.2 |
| 4,868,822 | 9/1989 | Scott et al. | 371/16.2 |

FOREIGN PATENT DOCUMENTS

| 0238713 | 9/1986 | German Democratic Rep. | 371/16.2 |
|---|---|---|---|
| 0143650 | 9/1982 | Japan | 371/16.2 |

OTHER PUBLICATIONS

Moon, Jim, "Microcomputer for Emulation Bares Hidden Buses, Functions", Electronics, Jul. 17, 1980, pp. 126-129.

Williams, Mike, "A Modular Approach to Microcontroller Emulation", Electronic Engineering, Oct., 1988, pp. 59-66.

"Single-Chip 8-Bit Microcontrollers, USER Manual", Philips Electronics Components & Materials Division, Eindhoven, The Netherlands, 1986, pp. 323-332.

Primary Examiner—Joseph A. Popek
Assistant Examiner—Rebecca L. Rudolph
Attorney, Agent, or Firm—Anne E. Barschall

[57] ABSTRACT

The device includes a parent microcontroller in a bond-out version and a derivative microcontroller in a non-bond-out version, in order to emulate the derivative microcontroller. To this end, the parent microcontroller is connected to an external program memory by means of memory connection pins. The derivative microcontroller comprises an additional functional processing facility, an internal program memory and a processor element. Upon emulation the derivative microcontroller receives an emulation control signal. Communication means between the processor and the internal program memory on the one side and the additional functional process facility on the other side are thus deactivated. Finally, the two microcontrollers are interconnected and connected to an external program memory in such a manner that a series of standard pins and the processor of the parent microcontroller are activated, and the external processing section of the derivative microcontroller and said external program memory are activated.

15 Claims, 5 Drawing Sheets

FIG. 1
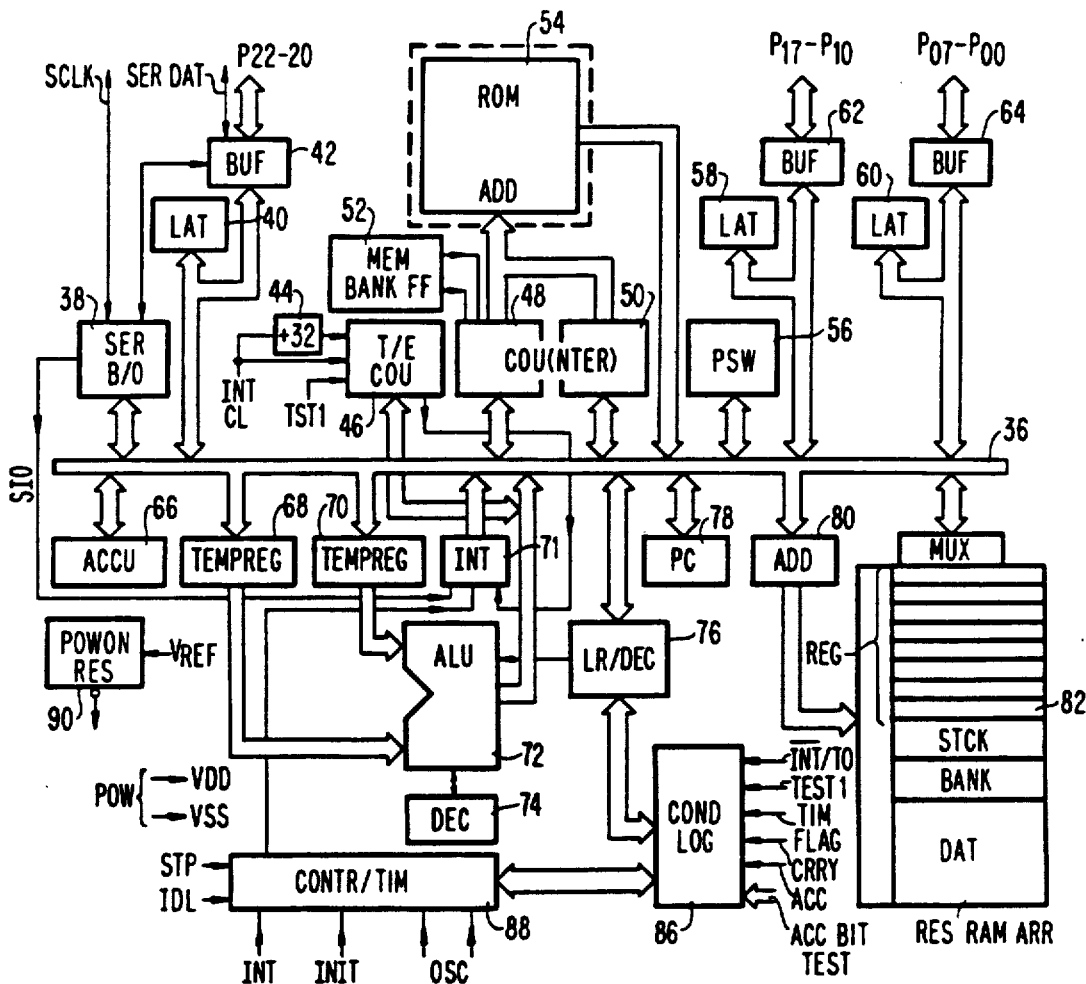
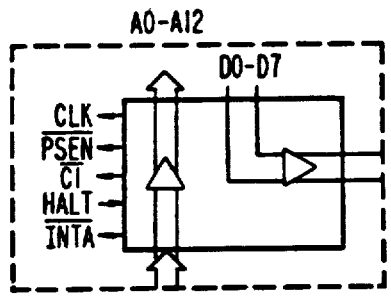
FIG. 2
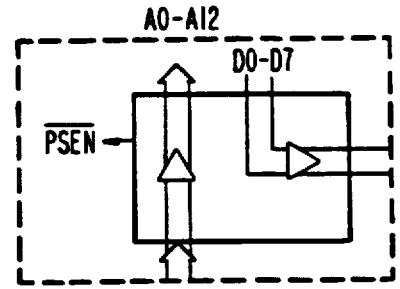
FIG. 3

DEVICE FOR EMULATING A MICROCONTROLLER USING A PARENT BOND-OUT MICROCONTROLLER AND A DERIVATIVE NON-BOND-OUT MICROCONTROLLER

This is a continuation of application Ser. No. 116,603, filed Nov. 2, 1987 now abandoned.

BACKGROUND OF THE INVENTION

The invention relates to a device for emulating a microcontroller, comprising a parent microcontroller in a bond-out version which comprises:
- a first series of standard pins, corresponding to those of a non-bond-out version, for executing input/output operations,
- a second series of memory connection pins for exchanging data, addresses and control signals with an external program memory,
- a third series of connection pins for exchanging control signals with an external hardware register,
- a processor element,
- and communication means between said processor element, said plurality of series of pins, and further parts of the parent microcontroller.

A microcontroller is to be understood to mean an integrated circuit which comprises a processor element, means for sequentially applying control signals of a program to the processor element, exchange means for exchanging user signals between the environment and the microcontroller, and a bus for communicating user signals between the exchange means and the processor element. Other facilities may also be provided. In a standard (non-bond-out) version, the program is stored in a part of the microcontroller, for example in a read-only memory (ROM) or in an EPROM whose contents can be written once, after which it cannot be electrically modified. Furthermore, a variety of further facilities may be added in order to enable or improve the operation in a user environment. For each user application of the microcontroller a specific control program is required. This program is designed in phases. After a preparatory phase, a program is loaded and it is stepwise checked whether the successive instructions are correct. In order to enable correction of any errors, such an emulation phase utilizes an external memory, for example a random access memory (RAM) or an EEPROM. To this end, a "bond-out" version is developed from the standard version of the microcontroller; therein additional external connection pins (address, data and control pins) are provided, while the internal program memory is completely or partly absent. A microcontroller of this kind is described in "Single-chip 8-bit microcontrollers USER MANUAL", Philips Electronic Components and Materials Division, International Business Relations, P.O. Box 218, Eindhoven, the Netherlands, 1986, pages 323 ff. The standard pins are stated on page 329. The memory connection pins for the external program memory are stated on page 330. The control pins for the emulation procedure are stated on page 331: $\overline{HALT}$, $\overline{INTA}$, $\overline{DXALE}$, IFF, STFF. Finally there is provided a series of connection pins for exchanging control signals with an external hardware register: $\overline{DXRD}$, $\overline{DXWR}$, EXDI. Each respective user application in principle requires only one specimen of a bond-out version; moreover, this single specimen can in principle be used for a plurality of user functions. The number of specimens of the standard version is in principle unlimited for each user function. Therefore, the development costs of the bond-out version generally bear on a comparatively small number of specimens.

Usually derivative versions are formed from such a microcontroller. These derivatives may differ from one another in a variety of ways, for example in that there is provided an additional external general-purpose connection (port), a connection facility for a display element (LCD), for a keyboard, and the presence of more or less storage capacity for program information or data. Many other possibilities also exist. Notably an additional amount of derivative logic will then be present.

The emulation of each derivative version in principle also requires a respective bond-out version. This necessitates an additional development effort. It is an object of the invention to provide means which allow for this emulation to be performed by means of a "bond-out" version of a parent microcontroller and a normal specimen of the derivative version with an extremely small number of modifications, notably the number of additional pins, for both versions.

The bond-out version is normally used also for manufacturing a prototype. In that case the external program memory is connected to the microcontroller by way of a so-called "piggy-back" connection. The same integrated circuit is then used, albeit the connections of this chip to the pins of the envelope differ from those used for the emulation. The difference between this approach and the emulation consists in that the physical dimensions of microcontroller plus external program memory deviate only slightly from those of the standard version (for example, the microcontroller can be used in a physically realistic environment) and in that the events in the time domain take place at the intended speed, so that a variety of situations which marginally function during the emulation phase and which would fail in normal operating conditions will now also fail at an early stage.

SUMMARY OF THE INVENTION

The object in accordance with the invention is achieved in that for the emulation of a derivative microcontroller which comprises, as a non-bond-out version of a derivative of the parent microcontroller, in addition to its own processor element, an internal program memory, an additional amount of derivative logic, own communication means, and an own series of standard pins, a first data connection of the own series of standard pins of the derivative microcontroller is connected, in parallel with a data connection within said second series of the parent microcontroller, to a data connection of said external program memory, a second data connection of the series of standard pins of the derivative microcontroller being connected to said third series of connection pins of the parent microcontroller, at least one control pin of said second data connection being connected, to said external program memory, each time in parallel with one corresponding control pin of said second series of the parent microcontroller, the derivative microcontroller comprising an emulation control means, a first state of said emulation control means deactivating said own communication means for the exchange with the own processor element and the internal program memory of the derivative microcontroller, so that the processor element of the parent microcontroller and said external program memory are activated instead, the first series of standard pins acting as the standard pins of the microcontroller to be emulated, and said additional derivative logic and further parts within the derivative microcontroller being activated and connected to the communication means of the parent microcontroller.

The costs of the additional circuitry required for the bond-out version of the parent microcontroller will be recovered already when a small number of different derivatives is developed.

The invention also relates to a parent microcontroller which is suitable for inclusion in a device for emulating a derivative microcontroller. Therein, only a few hardware and/or software elements should be provided, while in many cases these additional elements can also be effectively used for purposes other than an emulation device.

The invention also relates to a derivative microcontroller which is suitable for inclusion in a device of the kind set forth for emulation purposes. Some internal facilities and an additional control pin provided on the envelope in order to control the emulation are required in order to achieve the foregoing, so that the emulation can be realized by means of two controllers. This control pin, corresponding to a bond pad on the integrated circuit (chip) itself, may be omitted in some cases. The bond pad is then continually connected to the emulation-controlling potential.

Another solution consists in that the emulation control means is realized by means of a conductor which is provided on the substrate and which interconnects a suitable potential in a first position. In the second position (normal version), for example the other potential (power supply or ground) is interconnected. To this end only the pattern of conductors to be realized in a final process step (mask) is adapted. This step is much cheaper than the development of a bond-out version of the derivative microcontroller. The choice between the first and the second method depends on the availability of additional pins/bond pads and the like.

The invention also relates to an integrated circuit (chip) which is suitable, when accomodated in an envelope, for forming such a derivative microcontroller for the emulation thereof. The external program memory is thus always also connected to the parent microcontroller upon emulation. Notably when the number of data connections (ports) of the derivative microcontroller is already present in the parent microcontroller, the invention offers a set-up which can be very simply implemented. This integrated circuit is thus also implicitly suitable for realizing a previously cited prototype. Also in the case of use as a prototype, in accordance with the invention two microcontrollers (and one external program memory stacked on the derivative microcontroller in piggy-back fashion) are required.

The invention also relates to a microcontroller comprising an integrated circuit which itself is suitable for inclusion in such a derivative microcontroller. However, when the emulation control is set to the state "non-emulation", a microcontroller comprising the standard number of connection pins is realized. The latter control can be realized internally by connection to a fixed potential.

Further advantages and embodiments are described herein.

BRIEF DESCRIPTION OF THE FIGURES

The invention will be described in detail hereinafter with reference to some figures.

FIG. 1 shows a block diagram of a microcontroller of the type 84 COO;

FIG. 2 shows the substitution therein for the bond-out version;

FIG. 3 shows the substitution in FIG. 1 for the piggy-back version;

BRIEF RECAPITULATION OF A KNOWN MICROCONTROLLER

Figure 4:
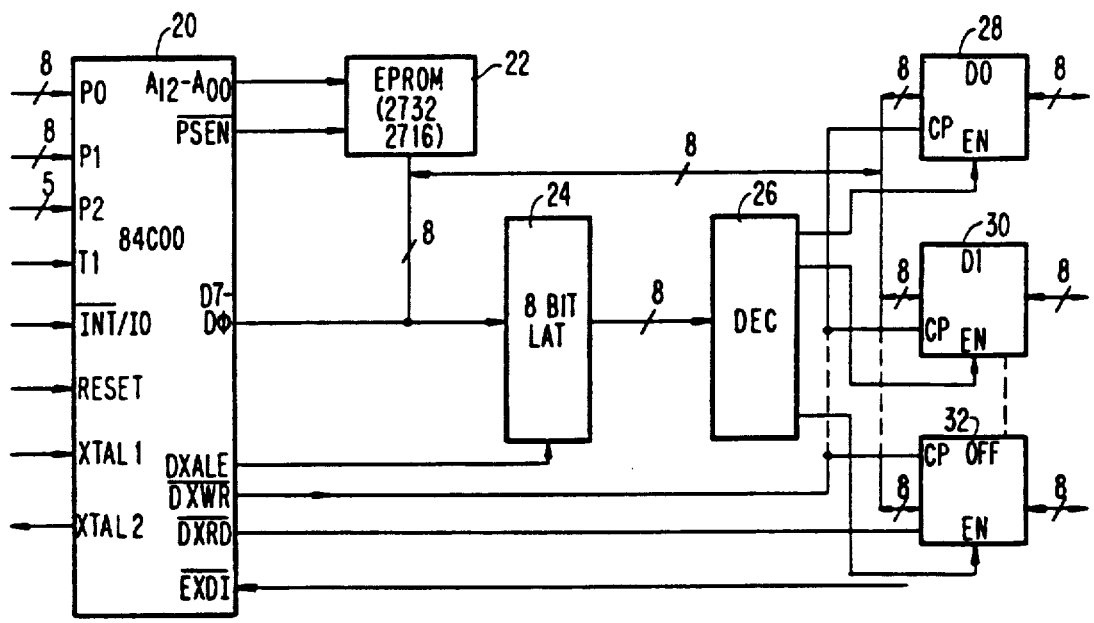
FIG. 4 shows the connection system (interface) for an external register for the bond-out version of FIG. 1.

For the purpose of illustration FIG. 1 shows a block diagram of the microcontroller (see also page 325 of the cited reference). To the central bus 36 (8 bits) there are successively connected:

- an interface 38 for a serial data connection, comprising a clock connection SCLK, a serial data connection SERDAT, and an interrupt connection SIO;
- a latch circuit 40 and a buffer 42 for an 8-bit connection;
- a divider-by-32 (44) and a counter 46 which receive the internal clock frequency;
- two program counters (48, 50);
- memory bank flipflops 52;
- a residential program ROM 54;
- a program status word register 56;
- two 8-bit connections with latches 58, 60 and buffers 62, 64;
- an accumulator 66;
- two temporary registers 68, 70;
- an ALU (72) with a decimal adjust element 74;
- an instruction register combined with a decoder 76;
- a program counter 78;
- a RAM address register 80;
- a residential RAM (82) with data multiplexer, address decoder, 8 registers, a register stack, an optional second register bank, a data memory section;
- a conditional branching logic block 86;
- a control and timing element 88;
- and a power-on-reset element 90.

FIG. 2 shows the substitute for the part 54 of FIG. 1 in order to obtain the bond-out version. The address and data lines are fed out and five control lines are provided also as external pins. This substitution thus concerns a modification of the circuit present on the substrate.

FIG. 3 shows the substitution in FIG. 1 for the part 54 which is necessary for the piggy-back version. The steps now concern a sub-category of those of FIG. 2. When the steps of FIG. 2 have been implemented on the substrate, the steps of FIG. 3 concern only a different configuration of the envelope: given bond pads need not be connected in that case, or are connected to a fixed potential (for example, ground). Such a piggy-back version is known per se.

DESCRIPTION OF AN EMULATION DEVICE OF A MICROCONTROLLER OF THE 84 CXX FAMILY

FIG. 4 shows a block diagram of a microcontroller of the type 84 COO which comprises a connection system for an external register. Therein, some elements are provided in order to enable the use of this parent microcontroller in a device for emulating a derivative microcontroller. The microcontroller, (element 20) is of the bond-out version and comprises the following series of standard pins (first series); the supply pins have been omitted for the sake of simplicity;

first data connection P0 (8 bits);
second data connection P1 (8 bits);
third data connection P2 (4+1 bits);
testable input pin T1;
interrupt connection $\overline{INT}/1\emptyset$;
reset pin RESET;
oscillator input XTAL1;
oscillator output XTAL2;

There is also provided the following second series of connection pins for an external program memory 22 (EPROM of the type 2732 or 2716):

address connection A12-AOO so that a program memory having a maximum number of 8k addresses can be used;
data connection D7-DO which has the same width as the connections P0, P1;
a memory activation connection $\overline{PSEN}$; because this program memory is used only in the read mode, the above number of pins suffices. The program memory can thus output data which are written into a suitable register or register section in the microcontroller 20 and which subsequently realize different control functions.

There is also provided an external 8-bit latch register 24. This register is connected to the data connection of the memory 22 and is activated under the control of an enable signal DXALE. A decoder 26 is connected to the register 24. The 8-bit data in the register 24 is converted into enable signals (in the decoder 26) for one or more of the data registers 28, 30, 32. These registers are connected in parallel to the data output of the memory 22 so that they have a capacity of at the most 8 bits. Further bidirectional connections of these registers to the environment are also shown. The data registers 28, 32 are synchronized by a signal $\overline{DXWR}$ (an external write control signal). As a result of the described organization, the registers 28, 32 can also be filled with data from the data connection D7-D$\emptyset$. It is also possible to use the data registers 28, 32 as a data source for the data connection D7-D$\emptyset$; to this end there is provided a control output $\overline{DXRD}$ which is symbolically connected only to the data register 32. The elements 24, 26, 28, 30, 32 may be constructed as conventional TTL components. The instructions MOV A, DX; MOV DX, A; ANL DX, A; ORL DX, A internally required for the above activations are described in the cited reference. The logic result of the last two instructions is stored in the relevant register DX. Finally, the microcontroller also comprises a connection pin $\overline{EXDI}$ for receiving an external interrupt signal. In the present simple example, however, this pin need not be used. The version of the element 20 used in the present example has the type number PCF4COOT; this is notably a 56-pin small model (S.O.—small outline) in which exactly the required number of connection pins is realized (a few more than shown in FIG. 4). For example, the supply pins are not shown.

Figure 5:
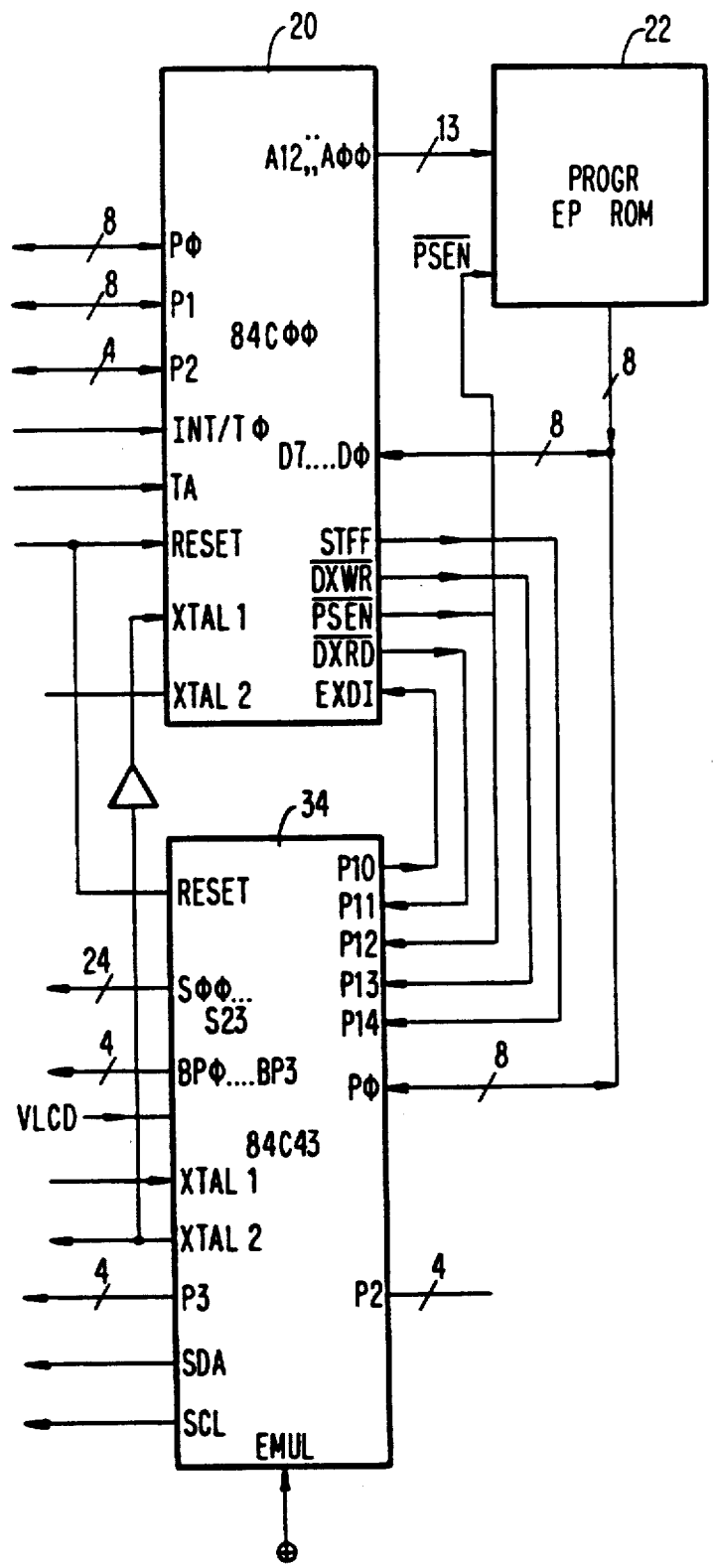
FIG. 5 shows a device in accordance with the invention for emulating a microcontroller of the 84 CXX family.

FIG. 5 shows a device in accordance with the invention for emulating a microcontroller of the 84 CXX family, for example the 84C43. The parent microcontroller 20 and the program memory 22 are shown in the same way as in FIG. 1. If desired, the memory 22 may be constructed as a random access memory (RAM) which forms part of a known emulation machine. This emulation machine may be, for example a PMDS/MAB (Philips Microprocessor Development System/Microcomputer Adapter Box) machine. This machine is commercially available (not shown for the sake of brevity). Interaction therewith can take place in the same way as described for the external registers in FIG. 4. The parent microcontroller thus operates as a master circuit.

Element 34 is the derivative microcontroller of the type 84C43. The additional derivative logic will be described with reference to FIG. 6. A number of standard pins are shown at the left:

the reset connection RESET;
the clock connections XTAL1, XTAL2;
the data connection P2, together with a serial data connection SDA for a so-called I²C bus;
the clock connection SCL associated with the I²C bus; in the standard version this pin corresponds to the pin T1; the I²C bus is implemented by means of components which are described at the register level in European Patent 51 332 and the corresponding U.S. Pat. No. 4,689,740 which is incorporated herein by way of reference;
the data connection P$\emptyset$;
the data connection P1; only five bit lines P10 ... P14 thereof are shown, the remainder is not used.

The derivative microcontroller also comprises means for driving a number of seven-segment display elements. That is to say, twenty-four segment control pins S$\emptyset\emptyset$-S23, whereby three seven-segment characters can be activated in parallel (the eighth bit is available for activating, moreover, a decimal stop). Four selection signals BP0 ... BP3 (backplane 0 ... 3) are also shown. These signals enable selection between four different display elements, so that the 12-character capacity suffices. The power supply for the display elements is received on pin VLCD. Finally, the derivative microcontroller comprises an additional data connection P2 which has a width of 4 bits. The pins and facilities S$\emptyset\emptyset$-S23, BP$\emptyset$ ... BP3, SDA, SCL, P2, VLCD form the additional facilities in the derivative microcontroller. For other derivative versions more, fewer and-/or other facilities may be provided. The exclusive omission of facilities with respect to the parent microcontroller generally does not necessitate specific emulation on the derivative microcontroller; however, in that case this emulation can be performed directly on the parent microcontroller. Alternatively, the parent microcontroller may comprise given facilities which are not present in the derivative microcontroller. However, each of the two microcontrollers always comprises a data processor element and adequate connection facilities and the derivative microcontroller comprises an internal program memory (otherwise the emulation would be unnecessary). In given cases the entire internal program memory of the parent microcontroller can be dispensed with, because an external program memory is always used.

The derivative microcontroller 34 can be emulated in that it is connected to the parent microcontroller 20 as follows. The connection PØ is connected to the data connection D7 . . . DØ of the parent microcontroller. The derivative microcontroller can thus present itself to the parent microcontroller in the same way as the register 24 in FIG. 4. Furthermore, the connection P1 is suitable for communicating a number of control signals with the parent microcontroller 20; the internal latch register provided standard with this connection temporarily stores these control signals. Connection pin P10 supplies the parent microcontroller with an external interrupt signal $\overline{\text{EXDI}}$. Connection pin P11 receives the read control signals $\overline{\text{DXRD}}$. Connection pin P12 receives, in parallel with the external memory 22, the enable signal $\overline{\text{PSEN}}$. Connection pin P13 receives the write control signal $\overline{\text{DXWR}}$. These four control signals have already been described with reference to FIG. 1. Connection pin P14 receives the stop control signal STFF. The stop control instruction can thus be executed; this instruction is executed in the parent microcontroller in order to save energy (for example, because the intended user environment comprises battery power supply). This situation is communicated to the derivative microcontroller by way of the signal STFF, so that the derivative microcontroller can also switch over to a stop mode. Switching between active modes and stop modes is known per se. This signal STFF can be advantageously used notably for realizing a prototype (because the latter will also comprise the above battery power supply).

Finally, the derivative microcontroller comprises an emulation control connection EMUL. Under the control of a first signal value on this connection, the derivative microcontroller operates in the normal mode. In that case inter alia the processor, the program memory and the random access memory provided on the chip operate in the normal mode. Under the control of a second signal value on this connection, the derivative microprocessor operates in the emulation mode and these components are disconnected. Instead, the element 22 is used as the program memory and the relevant parts of the parent microprocessor 20 (which does not include a program memory) are used for the processor and the random access memory. The additional functional facilities (derivative logic) of the derivative version in the derivative microcontroller which are not present in the parent microcontroller, however, should remain operational. The above first value is, for example ground potential. In that case this signal can be realized, for example by way of a connection to the ground pin (GND, not shown in FIG. 5) already provided on the chip, so that no additional connection pin on an envelope is required. This has only the drawback that the relevant specimen of the derivative microprocessor can no longer be used as an independent component in applications other than emulation. This connection will usually be realized by way of a specific wired connection between two bond pads.

Internal emulation control may be realized by way of a mask connection to one of two standard potentials (i.e. power supply and ground). The mask configuration for realizing the conductor tracks is then adapted. This means that the function must then be defined in an earlier production step than when use is made of an emulation control pin or bond pad.

Figure 6:
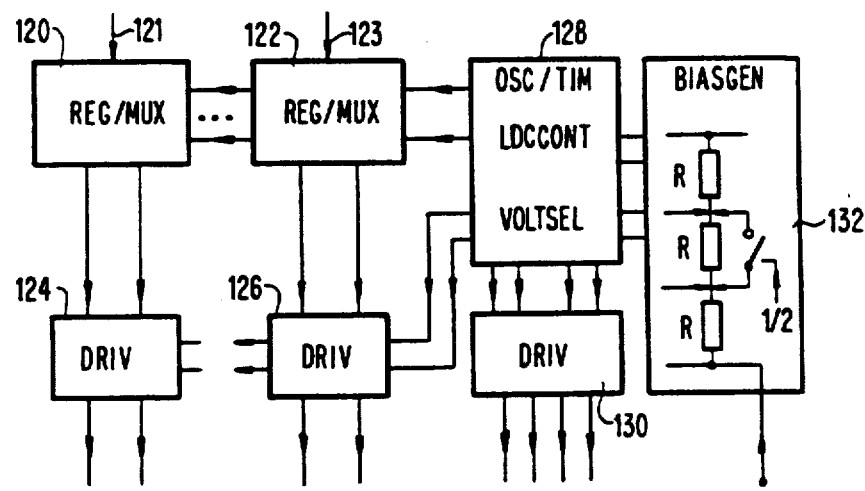
FIG. 6 shows an internal block diagram of a derivative microcontroller of the 84 CXX family for the additional functional processing facility embodying the derived version.

FIG. 6 shows an internal block diagram of a derivative microcontroller of the 84 CXX family illustrating additional functions specific to the derivative version. The facility includes a generator 132 for the LCD supply voltages. When a series connection of three resistors and a parallel switch is connected between the supply voltage VDD and the special supply voltage VLCD, LCD elements having an operating voltage of between 2 and 5 volts can be used. Element 128 comprises its own oscillator, time control and voltage selection facility for the LCD elements. Element 130 comprises four so-called backplane drive elements having four outputs. Elements 120 . . . 122 (actually twelve) comprise register elements and multiplex elements for two segment outputs (two display bits for each backplane). Elements 124 . . . 126 (again twelve) receive the power supply from the element 128 so that they each drive two display elements. The elements 120 . . . 122 are to be connected to the bus for the reception of the data to be displayed with a width of 8 bits. To this end, they are also selectively addressable. The adjustment of the display mode to stationary (one backplanes or multiplexed, as desired, on 2–4 different backplanes) can be realized by means of permanent wiring in the same way as previously described for the pin EMUL in FIG. 5. The connection to the bus then corresponds to twelve different addresses. The bus connections themselves are denoted by the arrows 121, 123 and thus ensure the supply of data and addresses. The further specification of the bus (width of data path and address path) has been omitted for the sake of simplicity.

Figure 7:
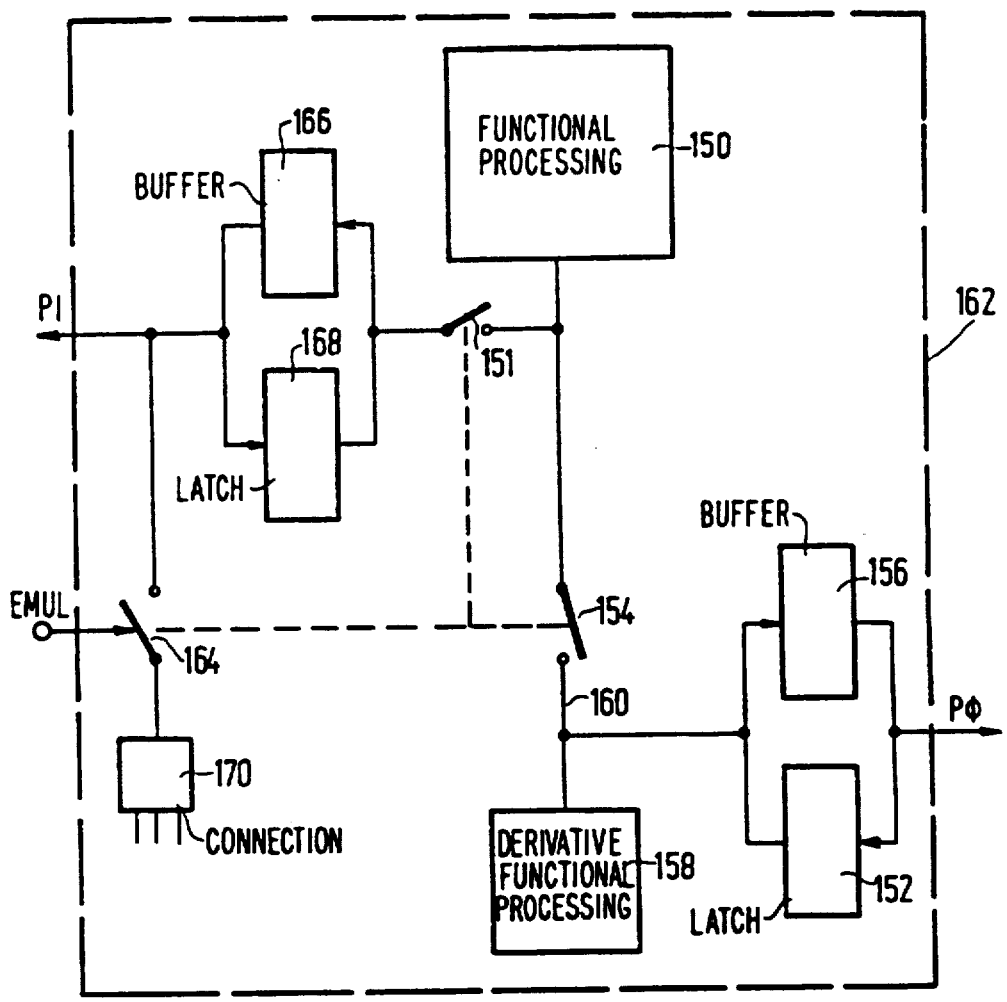
FIG. 7 illustrates the two modes of operation for such a derivative microcontroller.

FIG. 7 illustrates the two modes of operation for a derivative microcontroller as described above. The broken line 162 denotes the circuit accommodated on the substrate. Block 150 represents the major part of the functional processing elements shown in FIG. 1, notably the ALU, the residential program ROM, and the elements for controlling the ALU which are connected in the organization between the ALU and the residential program ROM. Line 160 symbolizes the bus which continues into block 158 in the closed state of the switch 154. The connection PØ is connected to the bus via a buffer 156 and a latch register 152. Similarly, the elements 166, 168 associated with the connection P1 are connected to the part of the bus situated above the switch 154. It is alternatively possible to replace the combination 152/156 by an organization which includes a bidirectional buffer, the devices then being activated by the signals $\overline{\text{DXWR}}$ and $\overline{\text{DXRD}}$ (see FIG. 5). Element 158 symbolizes the additional functional processing facilities for the derivative version, so in this case notably the elements shown in FIG. 6, the connection means for the serial I²C bus described above, and also the connection P3.

The switch 154 is opened and closed under the control of the signal on the connection pin EMUL. When the switch 154 is closed, therefore, all functional processing elements of the microcontroller are operational. When the switch 154 is open, only the additional derivative logic 158 is operational as well as the elements which are required for the emulation mode. Operational is to be understood to means herein that the interaction with the environment takes place in the usual manner. In the emulation mode the interaction between the block 150 and the environment is interrupted; inside the block 150, however, further actions may still take place. It is notably for this reason that the switch 151 is provided; this switch is opened together with the switch 154. Any signals supplied by the block 150 are then blocked as far as the environment is concerned. FIG. 7 shows the connection P0 and associated parts of the elements which are active for the emulation. This figure also concerns (as shown in FIG. 5);

the reset connection (element 90);

the oscillator connection XTAL2 (and hence the element 88).

The other standard functions are performed by the parent microcontroller so that they need not be active in the derivative microcontroller. In given cases the division may be such that given facilities in the derivative microcontroller remain active, even if they could be replaced by similar facilities in the parent microcontroller. An example in this respect is the situation where the parent microcontroller comprises a data memory (RAM), but the derivative microcontroller comprises a larger RAM. In that case a choice can be made between: the use of the entire parent RAM plus a part of the derivative RAM and the use of only the entire derivative RAM. The additional registers in the derivative microcontroller can usually be used as locations of the random access memory (RAM) of the parent microcontroller.

The facility in one of the two microcontrollers will be selected according to the nature of the facility and the architecture.

As is shown, the switch 154 can again be situated in the bus. In given cases the deactivation of the communication with the block 150 can be realized in a different manner. For correct connection of the control signals (pins P10 . . . 14) there is also provided a second switch 164. When the switch 154 is opened, the switch 164 is closed. The control signals are then communicated with the connection element 170. This element provides suitable buffering and is also connected to further parts of the circuit, for example in order to activate read, write or stop operations and for conducting an interrupt signal. The latter connections have been omitted for the sake of brevity. For the sake of simplicity, the realization control means by internal wiring on the chip has been omitted at the lay-out level.

DESCRIPTION OF AN EMULATION DEVICE FOR A MICROCOMPUTER OF THE 80C51 FAMILY

Figure 8:
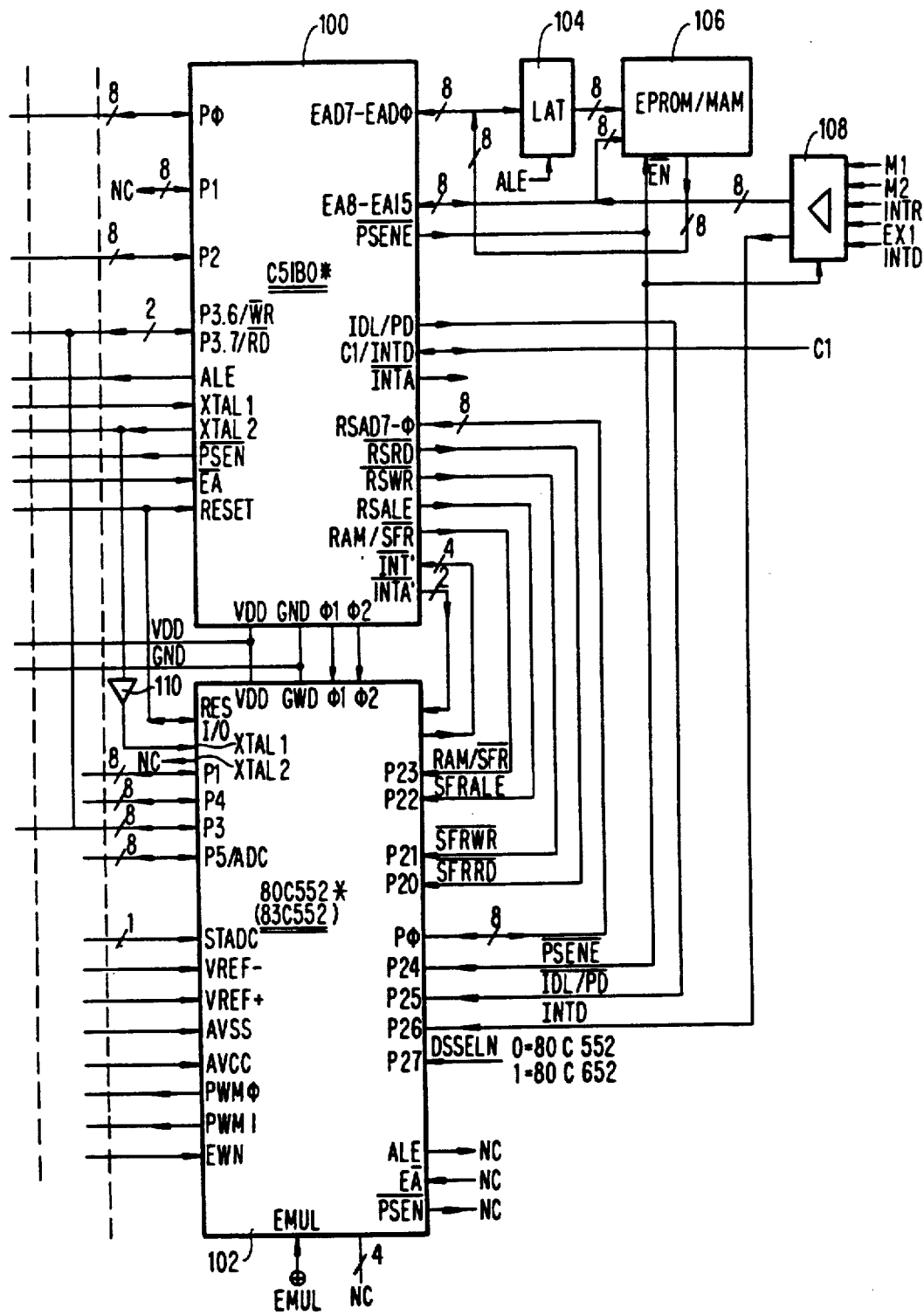
FIG. 8 shows a device in accordance with the invention for emulating a microcontroller of the 80 C51 family.

FIG. 8 shows a device in accordance with the invention for emulating a microcontroller of the 80C51 family. The main part of the parent microcontroller 80C51 B.O. (=bond-out) is described in the cited reference, pages 70–121. However, the connections RSAD7 . . . 0. . . INTA described hereinafter are added.

The parent microcontroller 100 comprises the following connections:

a data connection P0 (8 bits);

a data connection P1 (ditto; however, it is not used in the present embodiment)—8 bits;

a data connection P2 (8 bits);

a data connection P3 (8 bits); in addition to the function of data connection, the bit lines thereof have the following alternative functions: serial in/out; external interrupt (2×); external timer (2×); and external write (3.6) and read (3.7)-synchronization; in the emulation situation only the latter two bit lines are used;

address latch enable signal (ALE);

two clock connections XTAL1, 2;

enable signal for the program memory (PSEN), so that the internal program memory and an external program memory not intended for emulation can substitute for one another or supplement one another;

selection signal for selection between internal/external program memory (EA);

a reset signal (RESET);

a supply terminal (VDD) and a ground terminal (GND) which, of course, are present in all circuits shown.

The relevant bond-out version has the following facilities for the emulation:

an 8-bit latch circuit (104) which is controlled by the signal ALE;

a program memory (106) (EPROM) or the read/write memory of the emulation machine; this memory can receive addresses having a width of 16 bits; the data has a width of 8 bits.

a buffer/gating element 108 which receives a number of external signals M1, M2, INTR, EX1, INTD and which selectively conducts these signals.

The following connections are also provided:

a multiplexed line for the least-signficant address bits for the program memory as well as for the data bits (EAD7 . . . 0);

a multiplexed line for the most-significant address bits and the output signals of the buffer/gating element 108 (EA8 . . . EA15);

an enable signal PSENE which is especially intended for the emulation memory (deviates from PSEN);

a control signal which indicates whether the parent microcontroller is in the standby (idle) or power-down state; (in these states the program is not further executed, compare the stop mode in FIG. 2);

a machine selection signal (C1/INTD) which indicates whether the first, the second or a next cycle of a multi-cycle instruction is the current one; during the first cycle the opcode appears; during the second or further cycles operands may appear, or they may be provided for given prolonged executions such as multiplication;

an interrupt acknowledge signal (INTA) which, however, is not used in this context;

a multiplexed address/data signal (RSAD7 . . . 0) having a width of 8 bits;

the external read (RSRD) and write (RSWR) signals which correspond to the signals DXRD, DXWR of FIG. 2;

a latch register enable signal (RSALE);

a "memory/special" signal (RAM/SFR). which indicates whether the data is intended for the random access memory of the derivative microcontroller or for a register or registers having a special function included therein;

finally, there may also be provided a small number of synchronization handshake signal connections (INT', INTA') for an interrupt mechanism; (as a result of this facility, the instant of appearance of an interrupt signal need not be subject to restrictions which could be caused by timing relations between the parent microcontroller and the derivative microcontroller).

The derivative microcontroller 102 is shown in two versions which differ as regards their additional derivative logic. In the first derivative version, only a serial bus connection for an I²C system is provided above the elements of the parent microcontroller. The derivative microcontroller has the following connections:

two connection pins for power supply (VDD, GND);

two clock connection pins (01-02) for synchronization by means of clock signals from the parent microcontroller instead of by means of an external oscillator crystal;

a data connection having a width of 8 bits (P0) which is bidirectionally connected to RSAD7 . . . 0 of the parent microcontroller;

a data connection (P2) which has a width of 8 bits and the one-bit connections P20–P27 of which are used as follows:

P20: read control signal for the special function register ($\overline{\text{SFRRD}}$);

P21: ditto, write control signal ($\overline{\text{SFRWR}}$);

P22: ditto, enable signal (SFRALE);

P23: selection signal for making a selection between the random access memory and special function register (RAM/$\overline{\text{SFR}}$);

P24: the enable signal for the external program memory 106 ($\overline{\text{PSENE}}$) which synchronizes (bidirectionally) the status of the parent microcontroller and that of the derivative version;

P25: the signal standby/stop mode ($\overline{\text{IDL}}/\overline{\text{PD}}$) of the parent microcontroller;

P26: a stop bit which is formed by the emulation machine in order to stop the derivative/parent microcontroller, for example for the static reading of register contents therein. On the parent microcontroller this connection has the previously described double function. The signal INTD can be received from the buffer 108.

P27: this signal makes a selection between the two versions of the derivative microcontroller (83C652 and 83C552, respectively). The relevant signal can be obtained again by way of a selective bond connection as previously described for the signal EMUL in FIG. 5;

only the pins P36 and P37 of the data connection P3, having a width of 8 bits, are connected parallel to the pins P36 and P37, respectively, of the parent microcontroller. There are also provided a pair of connection pins which correspond to the pins $\overline{\text{INT}}$, $\overline{\text{INTA}}$ of the parent microcontroller in order to realize a synchronization handshake for an interrupt signal from the derivative microcontroller.

The other connections are absent or not used for emulating this version of the derivative microcontroller.

In the second derivative version a number of further facilities are realized which are embodied in relevant functional elements, i.e. AD conversion (from voltage to bit pattern), DA conversion (from bit pattern to pulse length modulation), additional connections P4, P5, a counting mechanism for events (event counter), a watchdog timer, and the previously mentioned I$^2$C connection. In addition to the previously described connections, the present version also comprises the following connections (only a few additional connections of the parent microcontroller are used; however, these were already provided in the present bond-out version):

a reset connection for the input/output mechanism (RESI/O) which is bidirectionally connected parallel to the reset connection of the parent microcontroller;

a clock signal input (XTAL1) which is controlled, via a buffer stage (110), by the clock signal output (XTAL2) of the parent microcontroller;

two data connections P1, P4 having a width of 8 bits; the remaining 6 bits of the 8bit data connection P3;

a data connection (P5) having a width of eight channels; on each of these channels an analog voltage can be received which can be converted into a digital signal in the derivative microcontroller. To this end, the analog signals can be received on a multiplexed AD converter. The channels can also be used for digital signals in which case they can be bidirectionally active;

a one-bit synchronization signal (STADC) for initializing the above analog-to-digital conversion (strobe);

two reference voltage connections (VREF+, VREF−) which are required in order to realize said analog-to-digital conversion;

two supply voltages (AVSS, AVCC) which are provided especially for the AD conversion;

two outputs for signals (PWM0, PWM1) analogized by pulse-width modulation;

EWN, an activation signal for the watchdog timer.

The following connections are not used:

the clock signal output XTAL2;

the address register enable line ALE;

$\overline{\text{EA}}$, an external activation signal; see also the parent microcontroller;

the line $\overline{\text{PSEN}}$ for an external program memory (see the parent microcontroller).

The activation and deactivation of the relevant functions can again be realized by means of a signal applied to the connection EMUL; this can be internally realized, for example in the manner corresponding to FIG. 7. When the additional facilities for the derivative microcontroller are continuously activated (for example, the switches 151/154 are closed and the switch 164 is open) by way of a voltage applied via a wire between two bond pads, it will no longer be necessary to provide a special pin on the envelope, so that the enclosed microcontroller can be used in the same way as the standard version, that is to say in any appropriate user environment.

A further possible use of a derivative microcontroller of the above type is as a peripheral apparatus of the parent microcontroller. In that case the internal program memory of the parent microcontroller can be activated again. Only the added functions of the derivative microcontroller are then operational. A derivative microprocessor whose arithmetic and logic unit and/or internal program memory are faulty can thus still be used; the parent microcontroller then acts as a stand-in for the faulty functions.

What is claimed is:

1. A device for emulating a microcontroller of a standard, non-bond-out type having standard pins, and a standard processor element, the claimed device comprising:

a. an external program memory;

b. a bond-out parent microcontroller, with respect to which the external program memory is external and which comprises:

i. a first plurality of pins, corresponding to the standard pins, for executing input/output operations;

ii. a second plurality of pins for exchanging data, addresses, and control signals with the external program memory;

iii. a third plurality of pins for exchanging control signals with external hardware;

iv. a processor element;

v. means for communicating between said processor element and said first, second, and third plurality of pins;

c. a derivative non-bond-out microcontroller of the standard non-bond-out type, with respect to which the external memory is external, comprising:
  i. a processor element;
  ii. an internal program memory;
  iii. communication means for exchanging information between the processor element of the derivative microncontroller and the internal program memory of the derivative microcontroller;
  iv. derivative logic, not present in the parent microcontroller;
  v. a plurality of pins, which are the standard pins, forming:
    A. a first data connection coupled to the external program memory, in parallel with the second plurality of pins of the parent microcontroller; and
    B. a second data connection coupled to the third plurality of pins of the parent microcontroller, and including at least one control pin coupled with said external program memory, in parallel with at least one corresponding control pin of the second plurality of pins of the parent microcontroller; and
  vi. emulation control means which assumes a state during emulation, in which state the emulation control means deactivates the communication means of the derivative microcontroller, so that during emulation
    A. the processor element, of the parent microcontroller, and the external program memory are activated instead of the processor element and internal program memory of the derivative microcontroller;
    B. the first plurality of pins of the parent microcontroller act as standard pins of the derivative microcontroller; and
    C. the derivative logic is activated and connected to the communication means of the parent microcontroller, whereby the derivative microcontroller performs functions specific to it which cannot be performed in the parent microcontroller;
whereby the parent microcontroller emulates the derivative microcontroller.

2. The device of claim 1 wherein
  a. the third plurality of pins of the parent microcontroller comprises a stop output for supplying a stop control signal;
  b. the emulation control means further comprises a stop control element connected to the stop output, the stop control element being for causing the derivative microcontroller to assume a stop mode.

3. The device of claim 1 wherein
  a) the microcontroller of the standard non-bond-out type has exactly one set of pins all of which are standard pins, which standard pins are standardized in their number, placement, and functions;
  b) the first plurality of pins corresponds to all of the standard pins; and
  c) the derivative microcontroller has exactly one plurality of pins, which are the standard pins.

4. A parent microcontroller for use in a device for emulating a microcontroller of a standard, non-bond-out type having standard pins, and a standard processor element, the device including:
  a. an external program memory, which is external to the parent microcontroller and any microcontroller to be emulated;
  b. a derivative non-bond-out microcontroller of the standard non-bond-out type, comprising:
    i. a processor element;
    ii. an internal program memory;
    iii. communication means for exchanging information between the processor element of the derivative microcontroller and the internal program memory of the derivative microcontroller;
    iv. derivative logic, not present in the parent microcontroller;
    v. a plurality of pins, which are the standard pins, forming:
      A. a first data connection coupled to the external program memory; and
      B. a second data connection including at least one control pin coupled with said external program memory; and
    vi. emulation control means which assumes a state during emulation, in which state the emulation control means deactivates the communication means of the derivative microcontroller;
  the claimed parent microcontroller comprising:
  c. a bond-out microcontroller which comprises:
    i. a first plurality of pins, corresponding to the standard pins;
    ii. a second plurality of pins for exchanging data, addresses, and control signals with the external program memory, in parallel with the first data connection of the derivative microcontroller, the second plurality of pins including at least one control pin corresponding to and coupled to the external program memory, in parallel with the at least one control pin of the second data connection of the derivative microcontroller;
    iii. a third plurality of pins for exchanging control signals with external hardware, and coupled with the second data connection of the derivative microcontroller, the third plurality of pins comprising two read and write control pins and an output for a latch register enable signal;
    iv. a processor element;
    v. means for communicating between said processor element and said first, second, and third plurality of pins;
  so that during emulation, under control of the emulation control means:
  d. the processor element, of the parent microcontroller, and the external program memory are activated instead of the processor element and communication means of the derivative microcontroller; and
  e. the first plurality of pins of the parent microcontroller act as the standard pins of the derivative microcontroller; and
  f. the derivative logic is activated and connected to the communication means of the parent microcontroller, whereby the parent microcontroller uses the derivative microcontroller to perform functions specific to the derivative microcontroller which cannot be performed in the parent microcontroller;
whereby the parent microcontroller emulates the derivative microcontroller.

5. The parent microcontroller of claim 4 wherein a. the third plurality of pins of the parent microcontroller comprises a stop output for supplying a stop control signal;

b. the derivative microcontroller further comprises a stop control element connected to the stop output, the stop control element being for causing the derivative microcontroller to assume a stop mode.

6. A parent microcontroller as claimed in claim 4, characterized in that it comprises a pair of synchronization handshake connections for interrupt signals for connection to corresponding synchronization handshake connections of said derivative microcontroller.

7. The microcontroller of claim 4 wherein
a) the microcontroller of the standard non-bond-out type has exactly one set of pins all of which are standard pins, which standard pins are standardized in their number, placement, and functions;
b) the first plurality of pins corresponds to all of the standard pins; and
c) the derivative microcontroller has exactly one plurality of pins, which are the standard pins.

8. A non-bond-out microcontroller of a standard, non-bond-out type having standard pins, and a standard processor element, for use as a derivative microcontroller in a device for emulating the derivative microcontroller, the device including:
a. an external program memory, which is external to both the derivative microcontroller and a bond-out parent microcontroller; and
b. such a bond-out parent microcontroller, which includes:
   i. a first plurality of pins, corresponding to all of the standard pins, for executing input/output operations;
   ii. a second plurality of pins for exchanging data, addresses, and control signals with the external program memory;
   iii. a third plurality of pins for exchanging control signals with external hardware;
   iv. a processor element;
   v. means for communicating between said processor element and said first, second, and third plurality of pins; the claimed microcontroller being of the standard non-bond-out type and comprising:
c. a processor element;
d. an internal program memory;
e. derivative logic, not present in the parent microcontroller;
f. communication means for exchanging information between the processor element of the microcontroller and the internal program memory of the microcontroller;
g. exactly one plurality of pins, which are the standard pins, for forming, during emulation:
   i. a first data connection for coupling with the external program memory, in parallel with the second plurality of pins of the parent microcontroller; and
   ii. a second data connection for coupling with the third plurality of pins of the parent microcontroller, and including at least one control pin for coupling with said external program memory, in parallel with at least one corresponding control pin of the second plurality of pins of the parent microcontroller; and h. emulation control means which assumes a state during emulation, in which state the emulation control means deactivates the communication means of the derivative microcontroller, such that:
   i. the processor element, of the parent microcontroller, and the external program memory are activated instead of the processor element and internal program memory of the microcontroller;
   ii. the first plurality of pins of the parent microcontroller act in place of the standard pins of the microcontroller; and
   iii. the derivative logic is activated and connected to the communication means of the parent microcontroller, whereby the derivative microcontroller performs functions specific to it which cannot be performed in the parent microcontroller;
whereby the parent microcontroller emulates the derivative microcontroller.

9. The derivative microcontroller of claim 8 wherein
a. the third plurality of pins of the parent microcontroller includes a stop output for supplying a stop control signal;
b. the emulation control means further comprises a stop control element connected to the stop output, the stop control element being for causing the derivative microcontroller to assume a stop mode.

10. The derivative microcontroller of claim 8 or 9 wherein the emulation control means comprises:
connection means for control signals, which connection means is
   i) activated in response to said state of said emulation control means and
   ii) coupled with a subset of the pins of the derivative microcontroller.

11. A derivative microcontroller as claimed in claim 8 or 9, characterized in that said emulation control means is mask programmed.

12. The derivative microcontroller of claim 8 wherein the emulation control means comprises a connection external to the derivative microcontroller.

13. The derivative microcontroller of claim 8, wherein the derivative microcontroller is an integrated circuit; and
further comprising means for providing a logic signal, for preventing the emulation control means from assuming the state.

14. The derivative microcontroller of claim 13 wherein the providing means includes a source, internal to an envelope of the integrated circuit, for the logic signal.

15. The microcontroller of claim 8 wherein
a) the microcontroller of the standard non-bond-out type has exactly one set of pins all of which are standard pins, which standard pins are standardized in their number, placement, and functions;
b) the first plurality of pins corresponds to all of the standard pins; and
c) the derivative microcontroller has exactly one plurality of pins, which are the standard pins.

* * * * *